United States Patent
Wang et al.

(10) Patent No.: US 12,363,068 B2
(45) Date of Patent: Jul. 15, 2025

(54) METHOD AND APPARATUS FOR CONFIGURING NETWORK LINE, AND METHOD FOR SCHEDULING NETWORK REQUEST

(71) Applicant: Beijing Volcano Engine Technology Co., Ltd., Beijing (CN)

(72) Inventors: Luoli Wang, Beijing (CN); Jian Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/816,646

(22) Filed: Aug. 27, 2024

(65) Prior Publication Data

US 2024/0422056 A1    Dec. 19, 2024

(30) Foreign Application Priority Data

Sep. 27, 2023   (CN) .......................... 202311265400.0

(51) Int. Cl.
*H04L 61/4511*   (2022.01)
*H04L 41/0894*   (2022.01)
(Continued)

(52) U.S. Cl.
CPC ...... *H04L 61/4511* (2022.05); *H04L 41/0894* (2022.05); *H04L 41/22* (2013.01); *H04L 67/52* (2022.05)

(58) Field of Classification Search
CPC ........... H04L 41/08–0806; H04L 41/22; H04L 61/30–35; H04L 61/45–4511; H04L 41/0893–0894; H04L 61/4511
See application file for complete search history.

(56) References Cited

U.S. PATENT DOCUMENTS

| 9,628,436 B1 | 4/2017 | Britt et al. | |
| 2003/0065762 A1* | 4/2003 | Stolorz | H04L 9/40 709/223 |

(Continued)

FOREIGN PATENT DOCUMENTS

| CN | 101764747 A | 6/2010 |
| CN | 108040085 A | 5/2018 |

(Continued)

OTHER PUBLICATIONS

ISA China National Intellectual Property Administration, International Search Report and Written Opinion for International Application No. PCT/CN2024/111898, mailed Oct. 11, 2024, 16 pages.

(Continued)

*Primary Examiner* — Brendan Y Higa
(74) *Attorney, Agent, or Firm* — Alleman Hall & Tuttle LLP

(57) ABSTRACT

The disclosure provides a method and apparatus for configuring a network line, and a method for scheduling a network request. The method includes: obtaining a network line configuration request; displaying, in response to the network line configuration request, a network line configuration page, and obtaining first line configuration information based on the network line configuration page, where the first line configuration information includes first operator information and/or first geographic location information; querying a target priority corresponding to the first line configuration information; and writing line configuration information into a preset mapping table according to an order of the target priority from high to low, and transmitting the preset mapping table to a data plane, so as to make the network line corresponding to the line configuration information effective.

15 Claims, 3 Drawing Sheets

(51) Int. Cl.
     *H04L 41/22*          (2022.01)
     *H04L 67/52*          (2022.01)

(56)              References Cited

U.S. PATENT DOCUMENTS

2008/0215718 A1*   9/2008   Stolorz ................ H04L 67/101
                                                                        709/223
2012/0096051 A1     4/2012   Davis et al.
2021/0352041 A1*  11/2021   Lin .................... H04L 61/4511

FOREIGN PATENT DOCUMENTS

| CN | 110995890 | A |   | 4/2020  |
|----|-----------|---|---|---------|
| CN | 114244805 | A | * | 3/2022  |
| CN | 115664963 | A | * | 1/2023  |
| CN | 116233127 | A |   | 6/2023  |
| CN | 116743700 | A | * | 9/2023  |
| CN | 117240707 | A |   | 12/2023 |
| CN | 117478636 | A | * | 1/2024  |
| EP | 3522466   | A1|   | 8/2019  |
| WO | 2022143061| A1|   | 7/2022  |

OTHER PUBLICATIONS

European Patent Office, Partial European Search Report Issued in Application No. 24194540.1, Jan. 28, 2025, Germany, 17 pages.
Extended European Search Report for European Application No. 24194540.1, mailed May 14, 2025, 18 pages.

* cited by examiner

METHOD AND APPARATUS FOR CONFIGURING NETWORK LINE, AND METHOD FOR SCHEDULING NETWORK REQUEST

CROSS-REFERENCE TO RELATED APPLICATION

This application claims priority to Chinese Application No. 202311265400.0 filed Sep. 27, 2023, the disclosure of which is incorporated herein by reference in its entity.

FIELD

The disclosure relates to the technical field of communication, and specifically relates to a method and apparatus for configuring a network line, and a method for scheduling a network request.

BACKGROUND

During domain name system (DNS) parsing, line configuration is crucial to delicacy scheduling and optimization of network quality. For conventional DNS parsing lines, the common line configuration mode is single and inflexible, which cannot achieve effective coverage for small-scale operators, resulting in increased network delay for small-scale operators.

SUMMARY

In view of that, an embodiment of the disclosure provides a method and apparatus for configuring a network line, and a method for scheduling a network request, so as to solve problems that a line configuration mode is single and inflexible, which cannot achieve effective coverage for small-scale operators, resulting in increased network delay for small-scale operators.

In a first aspect, an embodiment of the disclosure provides a method for configuring a network line. The method is applied to a control plane and includes:

Obtaining a network line configuration request;

Displaying, in response to the network line configuration request, a network line configuration page, and obtaining first line configuration information based on the network line configuration page, where the first line configuration information includes first operator information and/or first geographic location information;

Querying a target priority corresponding to the first line configuration information; and Writing the line configuration information into a preset mapping table according to an order of the target priority from high to low, and transmitting the preset mapping table to a data plane, so as to make the network line corresponding to the line configuration information effective.

In a second aspect, an embodiment of the disclosure provides a method for scheduling a network request. The method includes:

Receiving a network request message transmitted by a target device;

Parsing the network request message to obtain second operator information and/or second geographic location information corresponding to the target device;

Matching the second operator information and/or the second geographic location information against various line configuration information stored in a preset mapping table to obtain second line configuration information, where the preset mapping table collects the line configuration information arranged according to an order of a priority, and the line configuration information includes: operator information and/or geographic location information; and Scheduling the network request message to a target network line corresponding to the second line configuration information.

In a third aspect, an embodiment of the disclosure provides an apparatus for configuring a network line. The apparatus includes:

An obtaining module configured to obtain a network line configuration request;

A configuration module configured to display, in response to the network line configuration request, a network line configuration page, and obtain first line configuration information based on the network line configuration page, where the first line configuration information includes first operator information and/or first geographic location information;

A querying module configured to query a target priority corresponding to the line configuration information; and A processing module configured to write the line configuration information into a preset mapping table according to an order of the target priority from high to low, and transmit the preset mapping table to a data plane, so as to make the network line corresponding to the line configuration information effective.

In a fourth aspect, an embodiment of the disclosure provides an apparatus for configuring a network line. The apparatus includes:

A reception module configured to receive a network request message transmitted by a target device;

A parsing module configured to parse the network request message, and obtain second operator information and/or second geographic location information corresponding to the target device;

A matching module configured to match the second operator information and/or the second geographic location information against various line configuration information stored in a preset mapping table, and obtain second line configuration information, where the line configuration information in the preset mapping table is arranged according an order of to a priority, and the line configuration information includes: operator information and/or geographic location information; and A scheduling module configured to schedule the network request message to a target network line corresponding to the second line configuration information.

In a fifth aspect, an embodiment of the disclosure provides a computer device. The computer device includes: a memory and a processor. The memory is in communication connection with the processor. The memory stores a computer instruction. The processor executes the method according to the first aspect or any one of the implementations corresponding to the first aspect by executing the computer instruction.

In a sixth aspect, an embodiment of the disclosure provides a computer-readable storage medium. The computer-readable storage medium stores a computer instruction. The computer instruction is configured to cause a computer to execute the method according to the first aspect or any one of the implementations corresponding to the first aspect.

BRIEF DESCRIPTION OF THE DRAWINGS

In order to more clearly illustrate specific implementations of the disclosure or technical solutions in the prior art, the accompanying drawings necessary for the description of the specific implementations or the prior art will be briefly introduced below. Obviously, the accompanying drawings in the following description are some implementations of the disclosure, and those of ordinary skill in the art can still derive other drawings from these accompanying drawings without any inventive effort.

DETAILED DESCRIPTION OF EMBODIMENTS

For making objectives, technical solutions and advantages of embodiments of the disclosure more clear, the technical solutions in the embodiments of the disclosure will be clearly and completely described below in conjunction with the accompanying drawings in the embodiments of the disclosure. Obviously, the described embodiments are some embodiments rather than all embodiments of the disclosure. Based on the embodiments of the disclosure, all other embodiments obtained by those skilled in the art without making inventive efforts fall within the protection scope of the disclosure.

The embodiments of the disclosure provide a method and apparatus for configuring a network line, and a method for scheduling a network request. It should be noted that steps illustrated in flow diagrams of the accompanying drawings may be executed in a computer system such as a set of computer-executable instructions, and although a logical order is illustrated in the flow diagrams, in some cases, the steps shown or described may be executed in an order different from that herein.

Figure 1:
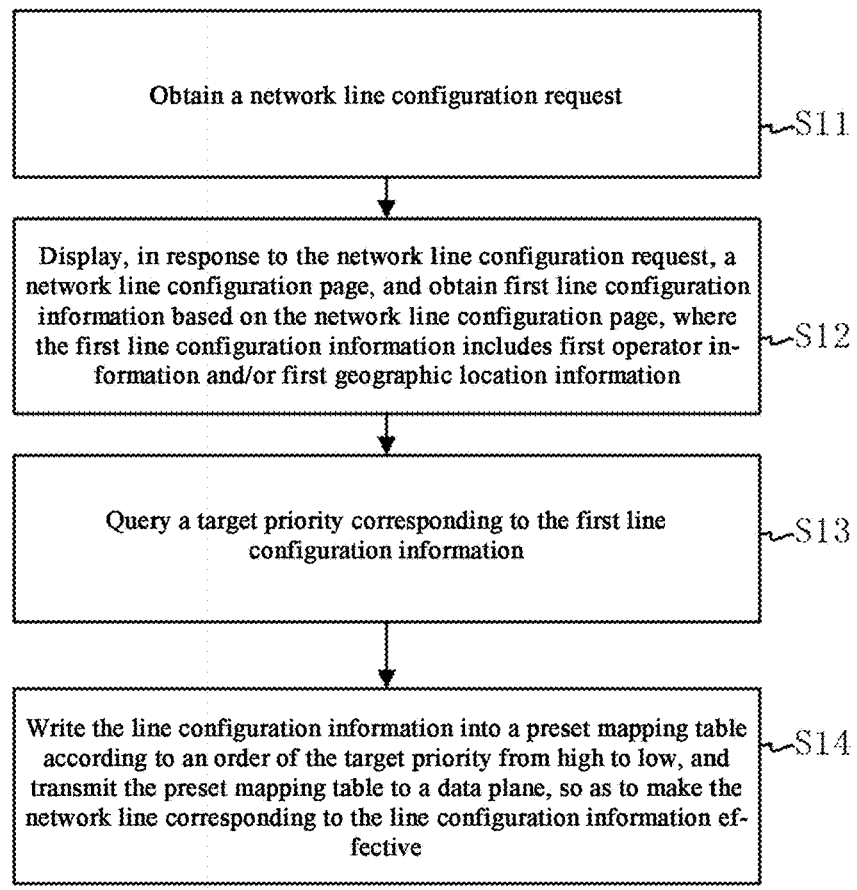
FIG. 1 is a schematic flow diagram of a method for configuring a network line according to some embodiments of the disclosure.

The embodiment provides the method for configuring a network line. FIG. 1 is a flow diagram of a method for configuring a network line according to an embodiment of the disclosure. As shown in FIG. 1, the method includes the following steps:

S11, a network line configuration request is obtained.

The method according to the embodiment of the disclosure is applied to a control plane. Specifically, a developer may trigger the network line configuration request based on the control plane, such that the developer configures the network line based on the control plane. It should be noted that the control plane is configured with a line priority list, such as provincial operator-province/state/nation lines-regional operator lines-regional lines-operator lines, and the like. The control plane may automatically match the line priority list against line configuration information input by the developer, such that a corresponding line priority is obtained. In a subsequent network scheduling process, different network request messages may be scheduled to network lines of different priorities, such that network coverage can be expanded, and scheduling efficiency of the network request message can be improved.

Step S12, in response to the network line configuration request, a network line configuration page is displayed, and first line configuration information is obtained based on the network line configuration page. The first line configuration information includes first operator information and/or first geographic location information.

In the embodiment of the disclosure, in response to the network line configuration request, the control plane displays the network line configuration page, a selection operation on the network line configuration page is detected, and a configuration mode, a configuration type of an operator mode or a geographic location mode, of a current network line are determined according to the selection operation. According to the configuration mode, a corresponding configuration option is displayed on the network line configuration page.

Figure 2:
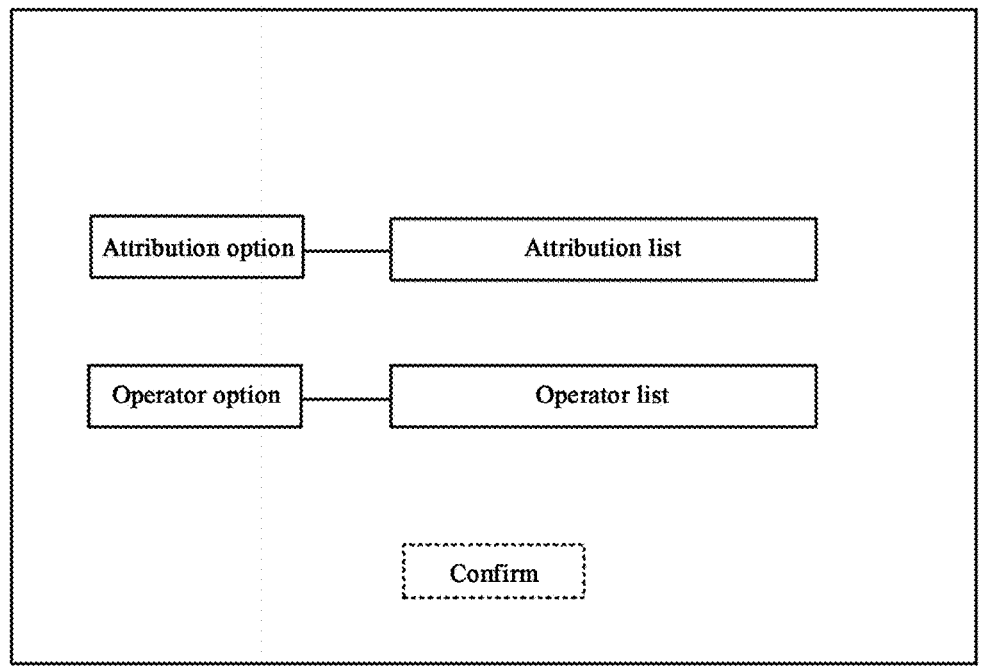
FIG. 2 is a schematic diagram of a network line configuration interface according to some embodiments of the disclosure.

As shown in FIG. 2, when the configuration type is the operator mode, the configuration options include: an operator option and an attribution option. A click operation on the attribution option is detected, and an attribution list is displayed according to the click operation. The attribution list includes an attribution identifier G1, an attribution identifier G2, and an attribution identifier G3. A click operation on the attribution list is detected, and a selected attribution identifier is determined. Then, a click operation on the operator option is detected, and an operator list is displayed according to the click operation. The operator list includes an operator identifier N1, an operator identifier N2, and an operator identifier N3. A click operation on the operator list is detected, and a selected operator identifier is determined. Finally, the first operator information is generated according to the selected attribution identifier and operator identifier.

Figure 3:
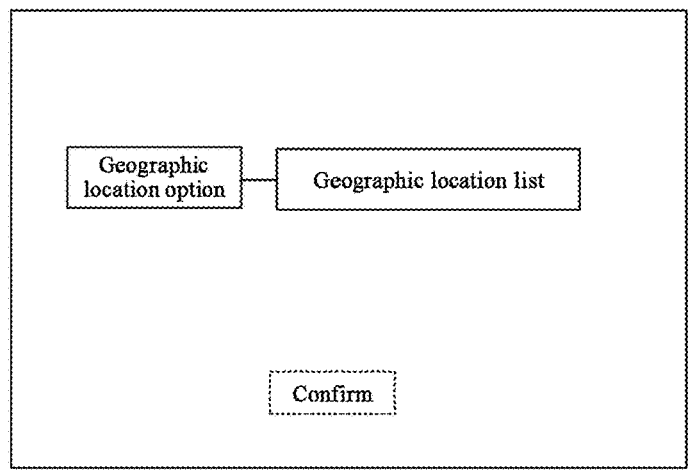
FIG. 3 is a schematic diagram of a network line configuration interface according to some embodiments of the disclosure.

As shown in FIG. 3, when the configuration type is the geographic location mode, the configuration option may include: a geographic location option. A click operation on the geographic location option is detected, and a geographic location identifier M1, a geographic location identifier M2 and a geographic location identifier M3 are displayed according to the click operation. Finally, the first geographic location information is generated according to the selected geographic location identifier. The attribution identifier may be consistent with the geographic location identifier or not. For the purpose of distinction, the embodiment of the disclosure uses different identifiers for identifying.

It should be noted that the developer may select a single mode for configuration according to the network line configuration page, that is, only use the operator mode for configuration or only use the geographic location mode for configuration of the network line. Alternatively, the developer may use a hybrid mode for configuration, that is, combine the operator mode and the geographic location mode for configuration of the network line.

Step S13, a target priority corresponding to the first line configuration information is queried.

In the embodiment of the disclosure, querying the target priority corresponding to the first line configuration information includes the following steps A1-A4:

Step A1, a pre-built line priority list is obtained. The line priority list includes: configuration identifiers are arranged according to an order of a priority from high to low.

In the embodiment of the disclosure, the line priority list includes the configuration identifiers being arranged according to the order of the priority from high to low. The configuration identifier may be understood as a general name of an operator or a general name of a geographic location. For instance, the line priority list includes configuration identifiers corresponding to three priorities. A configuration identifier corresponding to a first priority is: country-province-isp, where country and province denote configuration identifiers of an attribution, and isp denotes a configuration identifier of an operator. A configuration identifier corresponding to a second priority is: country-group-isp, where country and group denote configuration identifiers of an attribution, and isp denotes a configuration identifier of an operator. A configuration identifier corresponding to a third priority is: scope-continent-country-isp, where scope, continent and country denote configuration identifiers of an attribution, and isp denotes a configuration identifier of an operator.

Step A2, the first line configuration information is parsed to obtain a target configuration identifier associated with the first line configuration information.

In the embodiment of the disclosure, parsing the first line configuration information to obtain the target configuration identifier associated with the first line configuration information includes the following cases:

(1) In response to determining that the line configuration information includes the first operator information, a first operator identifier and a first attribution identifier corresponding to the first operator identifier are extracted from the first operator information, and the first attribution identifier and the first operator identifier are parsed, such that the target configuration identifier is obtained.

It should be noted that if the line configuration information only includes the first operator information, it is indicated that a developer uses a single mode for line configuration. In this case, a first operator identifier N1 and a first attribution identifier G1 are directly extracted from the first operator information. The first operator identifier N1 is parsed to obtain "isp: N1", and the first attribution identifier G1 is parsed to obtain "country-province: G1". The target configuration identifier is "country-province, isp".

(2) In response to determining that the line configuration information includes the first geographic location information, a first geographic location identifier is extracted from the first geographic location information, and the first geographic location identifier is parsed, such that the target configuration identifier is obtained.

It should be noted that if the line configuration information only includes the first geographic location information, it is indicated that a developer uses a single mode for line configuration. In this case, a first geographic location identifier "M1" is directly extracted from the first geographic location information. The first geographic location identifier M1 is parsed to obtain "country-province: M1". The target configuration identifier is "country-province".

(3) In response to determining that the line configuration information includes the first operator information and the first geographic location information, a second operator identifier and a second attribution identifier corresponding to the second operator identifier are extracted from the first operator information, a second geographic location identifier is extracted from the first geographic location information, and the second operator identifier, the second attribution identifier and the second geographic location identifier are parsed, such that the target configuration identifier is obtained.

It should be noted that if the line configuration information includes the first operator information and the first geographic location information, it is indicated that a developer uses a hybrid mode for line configuration. In this case, a first operator identifier N1 and a first attribution identifier G1 are extracted from the first operator information. A first geographic location identifier M1 is extracted from the first geographic location information. The first operator identifier N1 is parsed to obtain "isp: N1", and the first attribution identifier G1 is parsed to obtain "country-province: G1". The first geographic location identifier M1 is parsed to obtain "country-province: M1". Finally, target configuration identifiers "country-province: G1, isp: N1" and "country-province: M1" are obtained.

Step A3, the target configuration identifier is matched against various configuration identifiers in the line priority list.

Step A4, in response to determining that a configuration identifier matched with the target configuration identifier exists in the line priority list, a priority in the line priority list corresponding to the target configuration identifier is determined as the target priority corresponding to the line configuration information.

In the embodiment of the disclosure, a key field in the target configuration identifier is matched against the configuration identifier in the line priority list, such that the target priority corresponding to the line configuration information is obtained.

For instance, in response to determining that the line configuration information only includes the first operator information, a key field in a target configuration identifier "country-province: G1" is "country-province", and a priority corresponding to the configuration identifier "country-province" in the line priority list is a first priority. In this case, the target priority corresponding to the line configuration information is the first priority.

Alternatively, in response to determining that the line configuration information only includes the first geographic location information, a key field in a target configuration identifier "scope-continent-country: G1" is "scope-continent-country", and a priority corresponding to the configuration identifier "scope-continent-country" in the line priority list is a third priority. In this case, the target priority corresponding to the line configuration information is the third priority.

Step S14, the line configuration information is written into a preset mapping table according to an order of the target priority from high to low, and the preset mapping table is transmitted to a data plane, so as to make the network line corresponding to the line configuration information effective.

In the embodiment of the disclosure, writing the line configuration information into the preset mapping table according to the order of the target priority from high to low, so as to make the network line corresponding to the line configuration information effective includes the following steps: the target configuration identifier and the line configuration information are written into the preset mapping table in a form of a key-value pair according to the target priority, such that the network line corresponding to the line configuration information is made effective. The target configuration identifier is used as a key name, and the line configuration information is used as a key value.

In the embodiment of the disclosure, contents stored in the preset mapping table are as follows:

A network line of the first priority is as follows:
Line 1-1 "country-province-isp: G1-N1", where key is country-province-isp, and value is G1-N1.
Line 1-2 "country-province: M1", where key is country-province, and value is M1.
A network line of the second priority is as follows: line 2-1 "country-group-isp: G2-N2", where key is country-group-isp, and value is G2-N2.
Line 2-2 "country-group: M2", where key is country-group, and value is M2.
A network line of the third priority is as follows:
Line 3-1 "scope-continent-country-isp: G3-N3", where key is country-province-isp, and value is G3-N3.
Line 3-2 "scope-continent-country: M3", where key is scope-continent-country, and value is M3.

The method according to the embodiment of the disclosure is compatible with two line configuration modes of operators and geographic locations, such that flexibility and accuracy of network line configuration are improved. In addition, in a configuration mode combining operators and geographic locations, network coverage can be expanded, and meanwhile, the network line can be configured according to the priority, such that access by a small-scale operator is rapid, and network delay is shortened.

Figure 4:
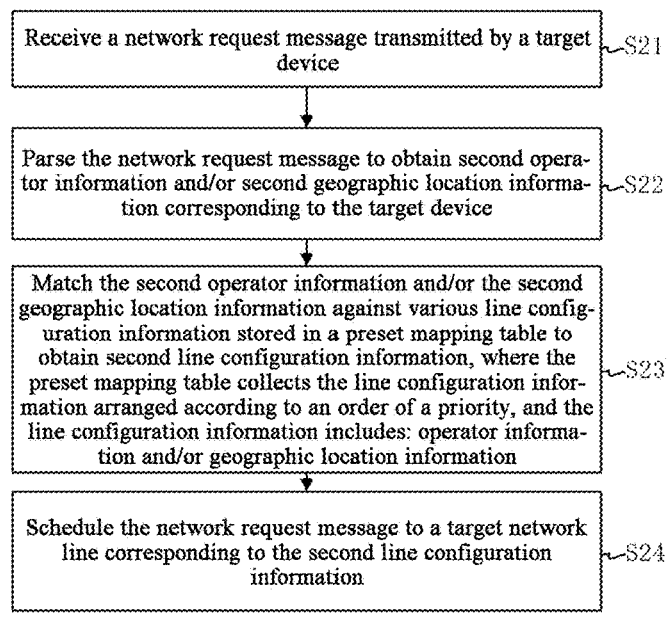
FIG. 4 is a schematic flow diagram of a method for scheduling a network request according to some embodiments of the disclosure.

FIG. 4 is a flow diagram of a method for scheduling a network request according to an embodiment of the disclosure. As shown in FIG. 4, the method includes the following steps:

Step S21, a network request message transmitted by a target device is received.

The method according to the embodiment of the disclosure is applied to a data plane. The data plane is configured to receive the network request message transmitted by the target device. The target device may be a plurality of devices in communication with the data plane, such as a smart phone, a notebook computer, and a smart watch, and the like. The network request message may be generated when the target device requests to access a certain video or a certain live broadcast room. The network request message carries a communication address field and an operator field of the target device.

Step S22, the network request message is parsed to obtain second operator information and/or second geographic location information corresponding to the target device.

In the embodiment of the disclosure, the data plane firstly extracts the communication address field and the operator field of the target device from the network request message, parses a communication address in the address field so as to obtain the second geographic location information corresponding to the target device, and parses an operator field so as to obtain the second operator information corresponding to the target device.

Step S23, the second operator information and/or the second geographic location information are/is matched against various line configuration information stored in a preset mapping table to obtain second line configuration information. The preset mapping table collects the line configuration information arranged according to an order of a priority. The line configuration information includes: operator information and/or geographic location information.

In the embodiment of the disclosure, matching the second operator information and/or the second geographic location information against various the line configuration information stored in the preset mapping table to obtain the second line configuration information includes the following steps B1-B2:

Step B1, line configuration information corresponding to a first priority is obtained from the preset mapping table, and the second operator information and/or the second geographic location information are/is matched against the line configuration information corresponding to the first priority.

Step B2, in response to determining that the second operator information and/or the second geographic location information are/is matched with the line configuration information corresponding to the first priority, the line configuration information corresponding to the first priority is determined as the second line configuration information.

As an instance, contents stored in the preset mapping table are as follows:
A network line of the first priority is as follows:
Line 1-1 "country-province: G1, isp: N1".
Line 1-2 "country-province: M1".
A network line of the second priority is as follows:
Line 2-1 "scope-continent-country: G2, isp: N2".
Line 2-2 "country-group: M2".
A network line of the third priority is as follows:
Line 3-1: "scope-continent-country: G3, isp: N3".
Line 3-2: "country-group: M3".

Firstly, the second operator information and/or the second geographic location information are/is used to be matched against the network line of the first priority. If the second operator information is matched with G1 and N1, "country-province: G1, isp: N1" is used as the second line configuration information. If the second operator information is not matched with G1 and N1, whether the second geographic location information is matched with M1 is determined. If yes, "country-province: M1" may be used as the second line configuration information. If the second operator information is matched with G1 and N1 and the second geographic location information is matched with M1, one of the second operator information and the second geographic location information is randomly selected as the second line configuration information.

In the embodiment of the disclosure, the method further includes the following steps: in response to determining that the second operator information and/or the second geographic location information are/is not matched with the line configuration information corresponding to the first priority, line configuration information corresponding to a second priority is obtained, where the second priority is a next priority of the first priority; and the second operator information and/or the second geographic location information are/is matched against the line configuration information corresponding to the second priority until the second line configuration information matched with the second operator information and/or the second geographic location information is obtained.

It should be noted that in response to determining that the second operator information and/or the second geographic location information are/is not matched with the line configuration information corresponding to the first priority, the next priority of the first priority is jumped to for matching, that is, the second operator information and/or the second geographic location information are/is used to be matched against the line configuration information corresponding to the second priority. If the second operator information and/or the second geographic location information are/is not matched with the line configuration information corresponding to the second priority, a next priority of the second priority is continued to be jumped to for matching, that is, the second operator information and/or the second geographic location information are/is used to be matched against the line configuration information corresponding to the third priority until the second line configuration information matched with the second operator information and/or the second geographic location information is obtained.

Step S24, the network request message is scheduled to a target network line corresponding to the second line configuration information.

In the embodiment of the disclosure, after the second line configuration information is obtained, the data plane directly schedules the network request message to the target network line corresponding to the second line configuration information, such that accurate scheduling of the network request message is completed.

The method according to the embodiment of the disclosure parses the operator information and the geographic location information in the network request message, and matches the operator information and the geographic location information against corresponding network lines. Compared with matching against a network line configured in a single mode, the method improves matching accuracy of the network line, and improves scheduling efficiency of the network request message.

The embodiment further provides an apparatus for configuring a network line. The apparatus is configured to implement the above embodiments and preferred embodiments, which will not be repeated herein. The term "module", as used below, may achieve a combination of software and/or hardware having predetermined functions. While the apparatus described in the following embodiments is preferably achieved in software, achievement of hardware, or a combination of software and hardware, is also possible and conceivable.

Figure 5:
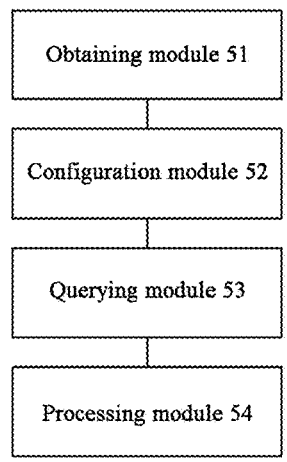
FIG. 5 is a block diagram of a structure of an apparatus for configuring a network line according to an embodiment of the disclosure.

The embodiment provides an apparatus for configuring a network line. As shown in FIG. 5, the apparatus includes:

An obtaining module 51 configured to obtain a network line configuration request;

A configuration module 52 configured to display, in response to the network line configuration request, a network line configuration page, and obtain first line configuration information based on the network line configuration page, where the first line configuration information includes first operator information and/or first geographic location information;

A querying module 53 configured to query a target priority corresponding to the line configuration information; and A processing module 54 configured to write the line configuration information into a preset mapping table according to an order of the target priority from high to low, and transmit the preset mapping table to a data plane, so as to make the network line corresponding to the line configuration information effective.

In the embodiment of the disclosure, the querying module 53 is configured to obtain a pre-built line priority list, where the line priority list includes: configuration identifiers arranged according to an order of a priority from high to low; parse the first line configuration information to obtain a target configuration identifier associated with the first line configuration information; match the target configuration identifier against various configuration identifiers in the line priority list; and determine, in response to determining that a configuration identifier matched with the target configuration identifier exists in the line priority list, a priority in the line priority list corresponding to the target configuration identifier as the target priority corresponding to the line configuration information.

In the embodiment of the disclosure, the querying module 53 is configured to extract, in response to determining that the line configuration information includes the first operator information, a first operator identifier and a first attribution identifier corresponding to the first operator identifier from the first operator information, and parse the first attribution identifier and the first operator identifier, such that the target configuration identifier is obtained.

Alternatively, the querying module 53 is configured to extract, in response to determining that the line configuration information includes the first geographic location information, a first geographic location identifier from the first geographic location information, and parse the first geographic location identifier, such that the target configuration identifier is obtained.

Alternatively, the querying module 53 is configured to extract, in response to determining that the line configuration information includes the first operator information and the first geographic location information, a second operator identifier and a second attribution identifier corresponding to the second operator identifier from the first operator information, extract a second geographic location identifier from the first geographic location information, and parse the second operator identifier, the second attribution identifier, and the second geographic location identifier, such that the target configuration identifier is obtained.

In the embodiment of the disclosure, the processing module 54 is configured to write the target configuration identifier and the line configuration information into the preset mapping table in a form of a key-value pair according to the target priority, such that the network line corresponding to the line configuration information is made effective. The target configuration identifier is used as a key name, and the line configuration information is used as a key value.

The embodiment further provides an apparatus for configuring a network line. The apparatus is configured to implement the above embodiments and preferred implementations, which will not be repeated herein. The term "module", as used below, may achieve a combination of software and/or hardware having predetermined functions. While the apparatus described in the following embodiments is preferably achieved in software, achievement of hardware, or a combination of software and hardware, is also possible and conceivable.

Figure 6:
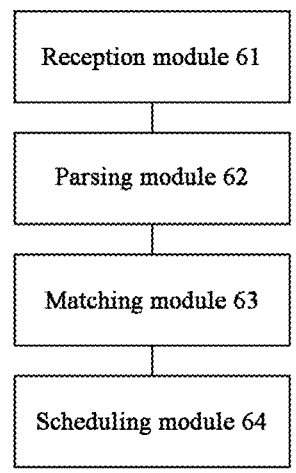
FIG. 6 is a block diagram of a structure of an apparatus for configuring a network line according to an embodiment of the disclosure.

The embodiment provides an apparatus for configuring a network line. As shown in FIG. 6, the apparatus includes:

A reception module 61 configured to receive a network request message transmitted by a target device;

A parsing module 62 configured to parse the network request message to obtain second operator information and/or second geographic location information corresponding to the target device;

A matching module 63 configured to match the second operator information and/or the second geographic location information against various line configuration information stored in a preset mapping table to obtain second line configuration information, where the line configuration information in the preset mapping table is arranged according to an order of a priority, and the line configuration information includes: operator information and/or geographic location information; and A scheduling module 64 configured to schedule the network request message to a target network line corresponding to the second line configuration information.

In the embodiment of the disclosure, the matching module 63 is configured to obtain line configuration information corresponding to a first priority from the preset mapping table, and match the second operator information and/or the second geographic location information against the line configuration information corresponding to the first priority; and determine, in response to determining that the second operator information and/or the second geographic location information are/is matched with the line configuration information corresponding to the first priority, the line configuration information corresponding to the first priority as the second line configuration information.

In the embodiment of the disclosure, the matching module 63 is further configured to obtain, in response to determining that the second operator information and/or the second geographic location information are/is not matched with the line configuration information corresponding to the first priority, line configuration information corresponding to a second priority, where the second priority is a next priority of the first priority; and match the second operator information and/or the second geographic location information against the line configuration information corresponding to the second priority until the second line configuration information matched with the second operator information and/or the second geographic location information is obtained.

Figure 7:
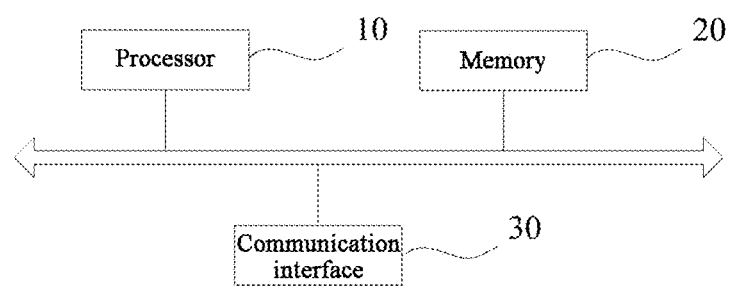
FIG. 7 is a schematic diagram of a hardware structure of a computer device according to an embodiment of the disclosure.

With reference to FIG. 7, FIG. 7 is a schematic diagram of a structure of a computer device according to an optional embodiment of the disclosure. As shown in FIG. 7, the computer device includes: one or more processors 10, a memory 20, and interfaces for connecting all components, which include a high-speed interface and a low-speed interface. All the components are in communication connection with one another with different buses, and may be mounted on a common mainboard or in other ways as required. The processor may process instructions executed in the computer device, which include instructions stored in or on the memory so as to display graphical information of a graphical user interface (GUI) on an external input/output apparatus (such as a display device coupled to the interface). In some optional embodiments, a plurality of processors and/or a plurality of buses may be used with a plurality of memories if necessary. Similarly, a plurality of computer devices may be connected, and each device provides some necessary operations (for instance, serving as a server array, a group of blade servers, or a multi-processor system).

The processor 10 may be a central processor, a network processor, or a combination thereof. The processor 10 may further include a hardware chip. The hardware chip may be an application-specific integrated circuit, a programmable logic device, or a combination thereof. The programmable logic device may be a complex programmable logic device, a field programmable logic gate array, a generic array logic, or any combination thereof.

The memory 20 stores an instruction executable by at least one processor 10, so as to cause the at least one processor 10 to implement the method according to the above embodiments.

The memory 20 may include a program storage area and a data storage area, where the program storage area may store an operating system and an application required for at least one function; and the data storage area may store data, etc. created according to usage of the computer device presented in an applet landing page. Moreover, the memory 20 may include a high-speed random access memory, and may further include a non-volatile memory, for instance, at least one magnetic disk memory device, a flash memory device, or other non-volatile solid-state memory devices. In some optional embodiments, the memory 20 optionally includes a memory remotely arranged with respect to the processor 10. The remote memories may be connected to the computer device by means of a network. Instances of the network include, but are not limited to, the Internet, an enterprise intranet, a local area network, a mobile communication network, and a combination thereof.

The memory 20 may include a volatile memory, and for instance, a random access memory. The memory may also include a non-volatile memory, and for instance, a flash memory, a hard disk, or a solid-state hard disk. The memory 20 may also include a combination of the above types of memories.

The computer device further includes a communication interface 30 configured to cause the computer device to be in communication with other devices or communication networks.

An embodiment of the disclosure further provides a computer-readable storage medium. The method according to the embodiments of the disclosure may be implemented in hardware or firmware, or implemented as a computer code that may be recorded in the storage medium or downloaded through a network, which is originally stored in a remote storage medium or a non-temporary machine-readable storage medium and is to be stored in a local storage medium, such that the method described herein may be processed in such software stored in a storage medium using a general-purpose computer, a special-purpose processor, or programmable or special-purpose hardware. The storage medium may be a magnetic disk, an optical disk, a read only memory, a random access memory, a flash memory, a hard disk or a solid-state hard disk. Further, the storage medium may also include a combination of the above types of memories. It may be understood that a computer, a processor, a microprocessor controller or programmable hardware includes a storage component that may store or receive software or a computer code, and when the software or computer code is accessed and executed by the computer, the processor or the hardware, the method shown in the above embodiments is implemented.

Although the embodiments of the disclosure are described in connection with the drawings, those skilled in the art can make various modifications and variations without departing from the spirit and scope of the disclosure, and such modifications and variations shall all fall within the scope defined by the appended claims.

We claim:

1. A method for configuring a network line, being applied to a control plane and comprising:
   obtaining a network line configuration request;
   displaying, in response to the network line configuration request, a network line configuration page, and obtaining first line configuration information based on the network line configuration page, wherein the first line configuration information comprises first operator information and/or first geographic location information;
   querying a target priority corresponding to the first line configuration information; and
   writing the line configuration information into a preset mapping table according to an order of the target priority from high to low, and transmitting the preset mapping table to a data plane, so as to make the network line corresponding to the line configuration information effective.

2. The method according to claim 1, wherein querying the target priority corresponding to the first line configuration information comprises:
    obtaining a pre-built line priority list, wherein the line priority list comprises: configuration identifiers arranged according to an order of a priority from high to low;
    parsing the first line configuration information to obtain a target configuration identifier associated with the first line configuration information;
    matching the target configuration identifier against various configuration identifiers in the line priority list; and
    determining, in response to determining that a configuration identifier matched with the target configuration identifier exists in the line priority list, a priority in the line priority list corresponding to the target configuration identifier as the target priority corresponding to the line configuration information.

3. The method according to claim 2, wherein parsing the first line configuration information to obtain the target configuration identifier associated with the first line configuration information comprises:
    extracting, in response to determining that the line configuration information comprises the first operator information, a first operator identifier and a first attribution identifier corresponding to the first operator identifier from the first operator information, and parsing the first attribution identifier and the first operator identifier to obtain the target configuration identifier.

4. The method according to claim 2, wherein parsing the first line configuration information to obtain the target configuration identifier associated with the first line configuration information comprises:
    extracting, in response to determining that the line configuration information comprises the first geographic location information, a first geographic location identifier from the first geographic location information, and parsing the first geographic location identifier, to obtain the target configuration identifier.

5. The method according to claim 2, wherein parsing the first line configuration information to obtain the target configuration identifier associated with the first line configuration information comprises:
    extracting, in response to determining that the line configuration information comprises the first operator information and the first geographic location information, a second operator identifier and a second attribution identifier corresponding to the second operator identifier from the first operator information, extracting a second geographic location identifier from the first geographic location information, and parsing the second operator identifier, the second attribution identifier, and the second geographic location identifier, to obtain the target configuration identifier.

6. The method according to claim 2, wherein writing the line configuration information into the preset mapping table according to the order of the target priority from high to low, so as to make the network line corresponding to the line configuration information effective comprises:
    writing the target configuration identifier and the line configuration information into the preset mapping table in a form of a key-value pair according to the target priority, such that the network line corresponding to the line configuration information is made effective, wherein the target configuration identifier is used as a key name, and the line configuration information is used as a key value.

7. A computer device, comprising:
    a memory and a processor, wherein the memory is in communication connection with the processor, the memory stores a computer instruction, and the processor reads the computer instruction from the memory and performs the computer instructions to:
    obtain a network line configuration request;
    display, in response to the network line configuration request, a network line configuration page, and obtain first line configuration information based on the network line configuration page, wherein the first line configuration information comprises first operator information and/or first geographic location information;
    query a target priority corresponding to the first line configuration information; and
    write the line configuration information into a preset mapping table according to an order of the target priority from high to low, and transmit the preset mapping table to a data plane, so as to make the network line corresponding to the line configuration information effective.

8. The computer device of claim 7, wherein the processor performs the computer instruction further to:
    obtain a pre-built line priority list, wherein the line priority list comprises: configuration identifiers arranged according to an order of a priority from high to low;
    parse the first line configuration information to obtain a target configuration identifier associated with the first line configuration information;
    match the target configuration identifier against various configuration identifiers in the line priority list; and
    determine, in response to determining that a configuration identifier matched with the target configuration identifier exists in the line priority list, a priority in the line priority list corresponding to the target configuration identifier as the target priority corresponding to the line configuration information.

9. The computer device of claim 8, wherein the processor performs the computer instruction further to:
    extract, in response to determining that the line configuration information comprises the first operator information, a first operator identifier and a first attribution identifier corresponding to the first operator identifier from the first operator information, and parse the first attribution identifier and the first operator identifier to obtain the target configuration identifier.

10. The computer device of claim 8, wherein the processor performs the computer instruction further to:
    extract, in response to determining that the line configuration information comprises the first geographic location information, a first geographic location identifier from the first geographic location information, and parse the first geographic location identifier, to obtain the target configuration identifier.

11. The computer device of claim 8, wherein the processor performs the computer instruction further to:
    extract, in response to determining that the line configuration information comprises the first operator information and the first geographic location information, a second operator identifier and a second attribution identifier corresponding to the second operator identifier from the first operator information, extract a second geographic location identifier from the first geographic location information, and parse the second operator identifier, the second attribution identifier, and the second geographic location identifier, to obtain the target configuration identifier.

12. The computer device of claim 8, wherein the processor performs the computer instruction further to:

write the target configuration identifier and the line configuration information into the preset mapping table in a form of a key-value pair according to the target priority, such that the network line corresponding to the line configuration information is made effective, wherein the target configuration identifier is used as a key name, and the line configuration information is used as a key value.

13. The computer device of claim 7, wherein the processor performs the computer instruction further to:

detect a selection operation on the network line configuration page;

determine a configuration mode of a current network line according to the selection operation; and display a corresponding configuration option on the network line configuration page according to the configuration mode.

14. The computer device of claim 13, wherein the configuration mode is an operator mode, the corresponding configuration option include an operator option and an attribution option, and the processor performs the computer instruction further to:

detect a click operation on the operator option;

display, in response to the click operation on the operator option being detected, an operator list according to the click operation;

detect a click operation on the operator list; and determine, in response to the click operation on the operator list being detected, a selected operator identifier.

15. A non-transitory computer-readable storage medium, storing a computer instruction thereon, wherein the computer instruction is configured to cause a computer to execute the method of claim 1.

* * * * *